Aug. 3, 1954    R. W. WILSON ET AL    2,685,240
IMPLEMENT HITCH
Filed Oct. 28, 1950    2 Sheets-Sheet 1
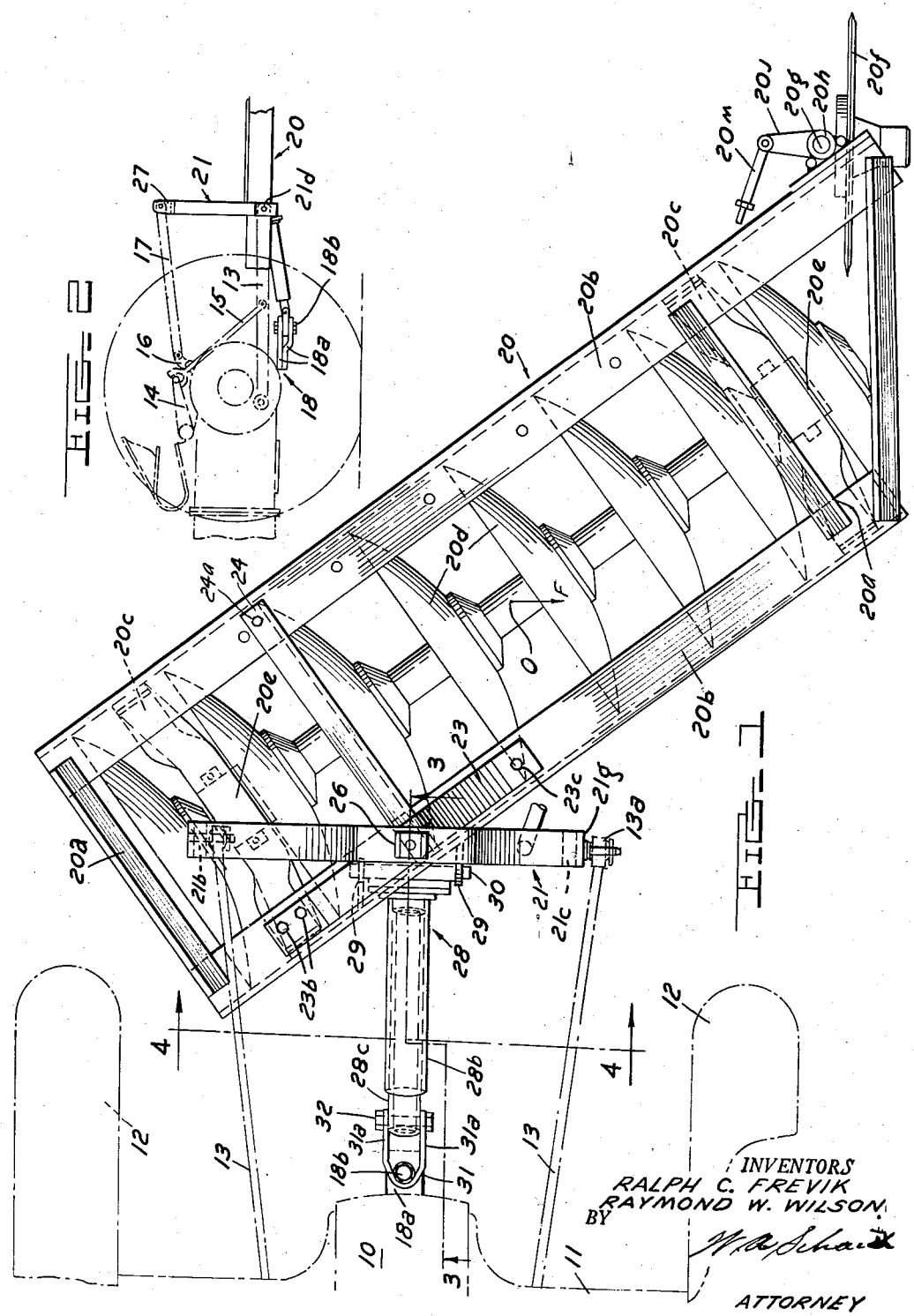
INVENTORS
RALPH C. FREVIK
RAYMOND W. WILSON
BY
ATTORNEY

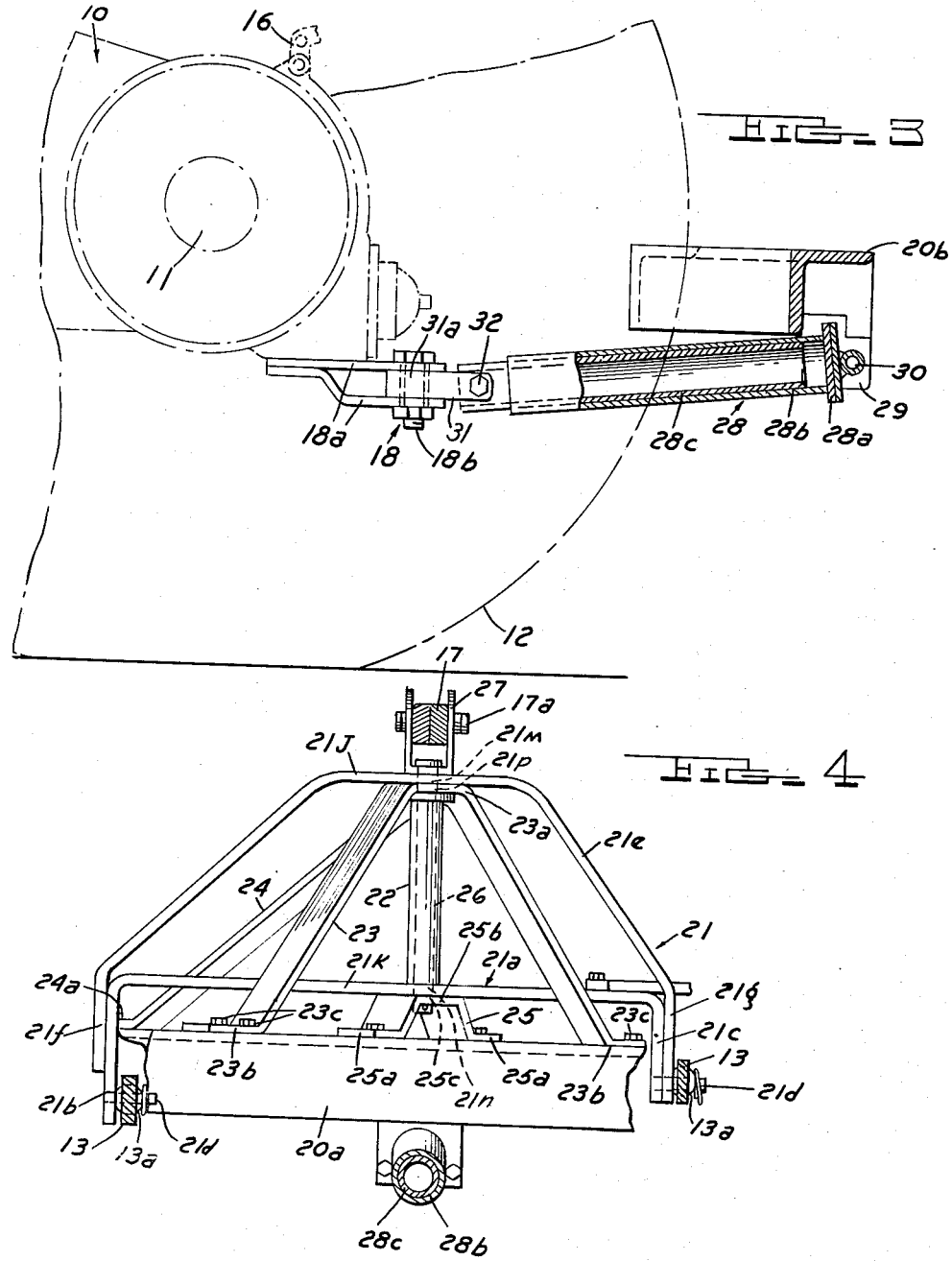

Patented Aug. 3, 1954

2,685,240

UNITED STATES PATENT OFFICE 2,685,240

IMPLEMENT HITCH

Raymond W. Wilson, Ferndale, and Ralph C. Frevik, Detroit, Mich., assignors, by mesne assignments, to Ford Motor Company, Dearborn, Mich., a corporation of Delaware Application October 28, 1950, Serial No. 192,742.

3 Claims. (Cl. 97—47.1)

This invention relates to an improved hitch for connecting farm implements to tractors, and particularly to a hitch construction for connecting an implement subject to side draft to tractors of the type having laterally spaced, universally pivoted, trailing hitch links.

In many farm implements, and particularly ground engaging types of implements such as moldboards and disc plows, a substantial lateral thrust is exerted upon the implement during its operation. Such lateral thrust is referred to as side draft. When the implement is connected in conventional manner to tractors having laterally spaced, universally pivoted, trailing hitch links, any unbalanced side draft of the implement is transferred to the tractor, and the effective point of application of the lateral forces involved in such side draft is generally located at the theoretical intersection of the hitch links which are generally slightly forwardly converging. Such theoretical intersection point is commonly located in the vicinity of the front axle of the tractor and, as a result, a substantial interference with the steering of the tractor is encountered whenever a side draft producing implement is pulled. Obviously, if the theoretical point of application of side draft forces could be located on the tractor at a point rearwardly of the front wheel, and preferably at a central point in the rear axle of the tractor, the adverse effects of implement side draft upon the steering of the tractor would be substantially eliminated.

Accordingly, it is an object of this invention to provide an improved implement hitch for tractors of the type having laterally spaced, universally pivoted, trailing hitch links.

A further object of this invention is to provide an improved hitch construction for implements subject to side draft for connection to the trailing draft links of the tractor which will locate the point of application of the implement side draft forces on the tractor at a point on the tractor producing a minimum interference with the steering and operation of the tractor.

A particular object of this invention is to provide an anti-side draft implement hitch for tractors having power-lifted hitch links which will not interfere in any manner with the lifting of the connected implement by such power-lifted hitch links for transport or depth control purposes.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Fig. 1 is a plan view of a side draft producing implement connected to a tractor by a hitch embodying this invention, with the tractor top link omitted for the purpose of clarity.

Fig. 2 is a reduced scale side elevational view of Fig. 1, with the tractor top link included.

Fig. 3 is an enlarged scale partial sectional view taken on the plane 3—3 of Fig. 1.

Fig. 4 is a partial sectional view taken on the plane 4—4 of Fig. 1.

As shown on the drawings:

The hitch construction hereafter described is particularly adaptable for use with a well known type of tractor 10 which has a rear axle housing 11 supported by a pair of rear wheels 12. At laterally spaced points on the rear axle housing 11, a pair of trailing hitch links 13 are respectively mounted on universal type pivot bearings, permitting the hitch links 13 to move both horizontally and vertically relative to the tractor. The hitch links 13 may be concurrently raised or lowered by a power lift mechanism (not shown) incorporated in the tractor which comprises a pair of rocker arms 14 (Fig. 2) which are respectively connected to the hitch links 13 by connecting links 15. At the top of the rear axle housing 11 a suitable pivot mounting 16 is provided for pivotally mounting the forward end of a top link 17. Beneath the rear axle housing and slightly rearwardly thereof, a clevis hitch 18 is provided, comprising spaced apart plate elements 18a which are suitably apertured to receive a vertically disposed clevis pin 18b.

The construction thus far described is entirely conventional and well known and further description thereof is deemed unnecessary.

While the hitch embodying this invention may be utilized with any type of implement which is subject to side draft, it will be particularly described and illustrated in connection with a one-way disc plow 20. Disc plow 20 may be of any conventional construction, for example, having a main rectangular frame defined by welded longitudinal angle beams 20a and transverse beams 20b. At transversely spaced points on such frame, bearing hangers 20c are provided and a gang of discs 20d are journalled in bearings 20e mounted to the lower end of hangers 20c in conventional fashion. In the normal operation of this type of implement, the axis of the disc gangs 20d is disposed in transverse angular relationship with respect to the path of travel of the tractor.

It is customary to provide a furrow wheel on such implements which, during operation of the implement, rides against the wall of the furrow produced by the implement and hence opposes the side draft forces inherently produced by the soil reaction on the angularly disposed ground engaging discs. Such a furrow wheel 20f may, for example, be mounted upon the laterally projecting end of one of the transverse frame members 20b and preferably has a vertically disposed mounting shaft 20g received in a vertical axis bearing 20h secured to the particular transverse frame beam. A rocker arm 20j is rigidly secured to the shaft 20g and is connected by a link 20m to a portion of the hitch mechanism and serves, as will be later described, to control the angular position of the furrow wheel 20f in accordance with the direction of travel of the tractor 10.

The hitch embodying this invention essentially comprises an upstanding frame structure 21 of generally A-shaped configuration. Such frame structure may comprise a channel shaped strap 21a having depending side arms 21b and 21c respectively. Pivot pins 21d are respectively rigidly mounted in the side arms 21b and 21c in transversely projecting relationship. Pivot pins 21d are suitably shaped so as to be engageable in the spherical type pivot bearings 13a which are respectively provided in the free ends of the tractor hitch links 13.

The hitch frame 21 further comprises an upstanding inverted U-shaped strap 21e which has the lower ends of its arms 21f and 21g welded respectively to the arms 21b and 21c and has a generally horizontally disposed bight portion 21j. Suitable aligned vertical apertures 21m and 21n are respectively provided in the center of the bight portion 21j of strap 21e and the web 21k of the channel shaped member 21a for a purpose to be later described. An inverted U-shaped strap 23 is provided which has its arms horizontally outturned as indicated at 23b and respectively secured to the front transverse frame member 20a of the implement 20, as by bolts 23c. The bight portion 23a of strap 23 abuts the bottom face of the bight portion 21j of strap 21e.

Additionally, a bearing spacer 25 is provided comprising an inverted U-shaped strap member having horizontally outturned ends 25a respectively secured to the top surface of the front transverse frame beam 20a of the implement and a horizontally disposed bight portion 25b which provides support for the central portions of the channel shaped member 21a. Both the bight portions 25b of the bearing spacer 25 and 21j of strap 21e are respectively provided with suitable vertical holes 25c and 21p in alignment with the holes 21m and 21n and hence a bearing pin or bolt 26 may be inserted through such holes, to effectively mount the hitch frame 21 to the implement 20 for movement relative thereto about a vertical axis. A spacer sleeve 22 surrounds pin 26 between channel 21a and strap 21e. U-shaped strap 23 and hence pin 26 is braced in an upright position by a strap 24 which surrounds the upper end of pin 26 underneath the bight portion 23a of strap 23. Strap 24 slopes downwardly and rearwardly for connection to the rear transverse frame member 20a by bolt 24a.

A U-shaped bracket 27 is rigidly secured to the top of the member 21e and has its bight portion vertically apertured to permit the shaft 26 to pass therethrough and its arm portions horizontally apertured to receive a pivot pin 17a for universally pivotally connecting the ends of top link 17 thereto. Accordingly, it is apparent that when the tractor hitch links 13 are raised or lowered by the power lift mechanism provided on the tractor, the entire implement 20 will be correspondingly raised or lowered.

Lastly, the hitch embodying this invention utilizes a forwardly projecting tongue structure 28 which is connected to the frame of the implement 20 in such manner as to be rigid therewith so far as relative horizontal movement is concerned. For example, a pair of laterally spaced, vertically disposed ears 29 may be rigidly secured to the front frame beam 20b and symmetrically located relative to the axis of the vertical pivot shaft 26. The ears 29 are traversed by a horizontally disposed pivot pin 30 and the rear end of tongue structure 28 incorporates a transversely disposed horizontal axis pivot bearing 28a which is mounted upon the pin 30. The tongue 28 also incorporates structure permitting its over-all length to be freely variable. For example, the tongue 28 may comprise a pair of telescopingly interconnected tubular members 28b and 28c. The rear tubular member 28b is rigidly secured to the pivot bearing 28a, while the forward tubular element 28c is pivotally secured to a yoke 31 which is in turn pivotally mounted on the tractor clevis hitch pin 18b. For example, the forward end of the front tubular element 28c may be shaped as to be insertable within the rearwardly projecting, transversely spaced arms 31a of the yoke 31 and is pivotally attached to such yoke for movement in a vertical plane by a transverse bolt 32.

From the foregoing description it is apparent that the described hitch arrangement will in no manner interfere with the free lifting and lowering of the implement by the tractor power-lifted hitch links 13, inasmuch as the tongue 28 is freely extensive or contractable in length to accommodate such movement. In operating the implement 20 with the described hitch construction, it is obvious that the effective side draft of such implement may be considered to be represented by a lateral force F operating at some point O which is intermediate the tractor 10 and the furrow wheel 20f. Since the furrow wall effectively opposes lateral movement of the furrow wheel 20f, and since the tractor is similarly laterally restrained through its own weight and the fact that one of its right hand wheels (as viewed in Fig. 1) is normally traveling in abutment with the furrow wall, it is apparent that the side draft forces operating effectively at the point O on the implement tend to pivot the implement about the pivotal mounting axis of the implement. However, any such tendency to pivot the implement is positively restrained by the tongue structure 28 by virtue of the fact that such tongue structure is rigid with the implement frame in so far as relative horizontal movements are concerned. Accordingly, the side draft forces will then be applied to the tractor by the effectively rigid tongue structure only at the point of connection of such tongue structure to the tractor, hence at the location of the tractor clevis hitch pin 18b. Since such hitch pin is located intermediate the rear wheels of the tractor, it is apparent that the application of the side draft forces of the implement to the tractor at such point will produce little, if any interference with the steering of the tractor.

It will, of course, be understood that various details of construction may be varied through a wide range without departing from the principles of this invention and it is, therefore, not the purpose to limit the patent granted hereon otherwise than necessitated by the scope of the appended claims.

We claim:

1. A hitch for connecting an implement subject to side draft to a tractor having a pair of laterally spaced, universally pivoted, trailing hitch links and a central rear hitch point, comprising in combination an articulated hitch frame of generally A-shaped configuration, vertical pin means for pivotally connecting said hitch frame to the implement in upstanding relationship and movable relative to the implement about a vertical axis, a pair of laterally projecting pivot pins respectively disposed on opposite sides of said hitch frame and adapted respectively for universal pivotal connection to the tractor hitch links, a forwardly projecting bracket on the central portion of said implement, a transverse pin mounted in said bracket, a freely extensible, forwardly projecting tongue link pivoted on said transverse pin, and hitch means on the front end of said tongue adapted for vertical axis pivotal connection with said central rear tractor hitch point.

2. The combination defined in claim 1 wherein said tongue link comprises freely sliding telescoping tubular members.

3. In an implement having a rigid implement frame and a steerable trailing furrow wheel carried by said frame for pivoted movement about a vertical steering axis, said implement being adapted for use with a tractor having a pair of laterally spaced, trailing hitch links universally pivoted to the tractor rear axle housing and forwardly convergent toward a theoretical hitch point located in advance of said rear axle housing and a central rear hitch point located at said rear axle housing, an implement hitch comprising a hitch frame adapted for pivotal connection to said implement frame for movement relative thereto about a vertical pivot axis, laterally spaced pivot pins on said hitch frame adapted respectively for universal pivotal connection to said tractor hitch links, said hitch frame thus being disposed for steering movement by said links about said theoretical hitch point, a freely extensible tongue link connected rigidly to said implement so far as relative horizontal movement is concerned, means on the front end of said tongue link adapted for vertical axis pivotal connection with said central rear tractor hitch point to steer the implement frame laterally about said central hitch point, and a generally longitudinally extending arm pivotally secured at one end to said hitch frame in laterally spaced relation to said vertical pivot axis and at the other end to said furrow wheel for steering the same about its steering axis in accordance with the steering of said frame about said theoretical hitch point.

References Cited in the file of this patent

UNITED STATES PATENTS

| Number | Name | Date |
|---|---|---|
| 2,320,141 | Kott | May 25, 1943 |
| 2,322,342 | Bunn | June 22, 1943 |
| 2,337,801 | Cook | Dec. 28, 1943 |
| 2,379,225 | Fraga | June 26, 1945 |
| 2,440,550 | Martin | Apr. 27, 1948 |